Figure 1:
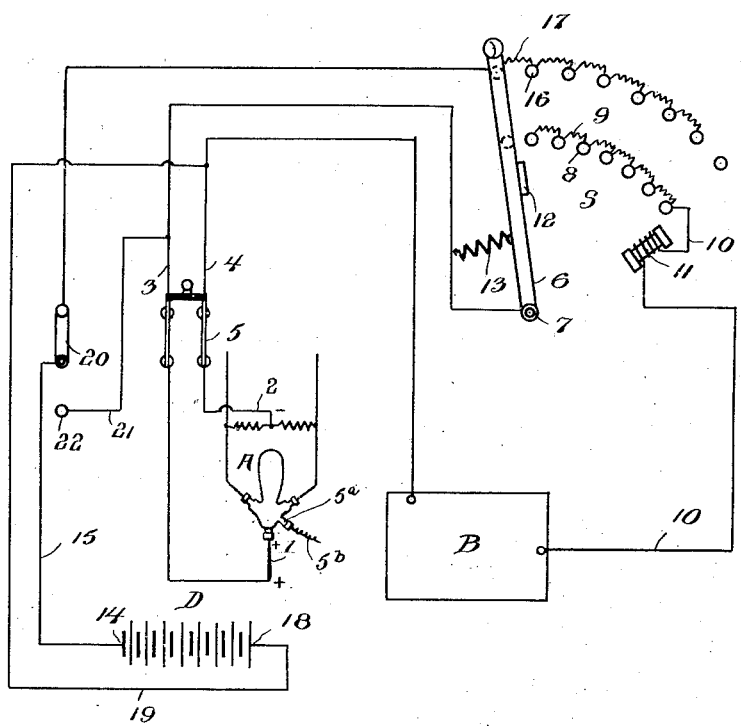

M. KUSHLAN.
MOTOR STARTER FOR RECTIFIER SYSTEMS.
APPLICATION FILED DEC. 21, 1911.

1,092,724. Patented Apr. 7, 1914.

Witnesses
William P. Smith

Inventor
Max Kushlan.
By Victor J. Evans
Attorney

UNITED STATES PATENT OFFICE.

MAX KUSHLAN, OF BOSTON, MASSACHUSETTS.

MOTOR-STARTER FOR RECTIFIER SYSTEMS.

1,092,724. Specification of Letters Patent. Patented Apr. 7, 1914.

Application filed December 21, 1911. Serial No. 667,203.

*To all whom it may concern:*

Be it known that I, MAX KUSHLAN, a citizen of the United States, residing at Boston, in the county of Suffolk and State of Massachusetts, have invented new and useful Improvements in Motor-Starters for Rectifier Systems, of which the following is a specification.

Heretofore the field of usefulness of a mercury arc rectifier has been considerably limited because of the fact that the current drop on the direct current side of the rectifier must not fall to a predetermined point, as otherwise the rectifier would cease operating and would have to be re-started and hence rectifiers have been unsuited for consumption devices or circuits wherein such devices or circuits take a gradual increase in current in starting or are subject to no-load conditions.

It is the object of the present invention to provide a starting means for motors or other direct current consumption devices or installations in combination with a mercury or other static rectifier which depends for its efficient operation upon the maintenance of the current flow on the direct current side within certain limits.

In carrying out the invention, a suitable means such as a secondary battery is used in connection with the motor or other consumption device with suitably arranged sets of resistances which are cut into and out of circuit in reverse order, with the result that as the resistance is cut out of the motor circuit, resistance is cut into the battery circuit so that more current will flow through the motor and less through the battery during the starting of the motor, the object being to utilize the storage battery for taking the full direct current output of the current rectifier when no current is passing through the motor and less and less of said output as current flow through the motor is increased, until finally a point is reached where the full current flows through the motor and none passes to the battery to charge the same. The battery thus forms an excess reservoir for making use of that portion of the current not consumed by the motor when there is no load on the latter and when the motor is being cut into circuit.

A no-load responsive device is employed in connection with the resistance box, so that the lever of the latter can return to initial or off position, thereby cutting out the resistance of the battery circuit and permitting the full direct current of the rectifier to charge the battery. The battery also serves as a source of current for the motor when the rectifier is not in use. It will thus be seen by the combination of circuits and electrical devices above set forth, it is possible to supply current to consumption circuits or devices that start with a gradual increase in current or which are subject to no-load conditions, and it is possible to make the utilization of power more uniform without sudden peaks and falls, the rectifier operating at its maximum efficiency at all times. Furthermore, the present invention is especially useful for electric railway systems, as 60 cycle rectifier sub-stations may be used instead of the usual 25 cycle rotary converter sub-station.

Figure 2:
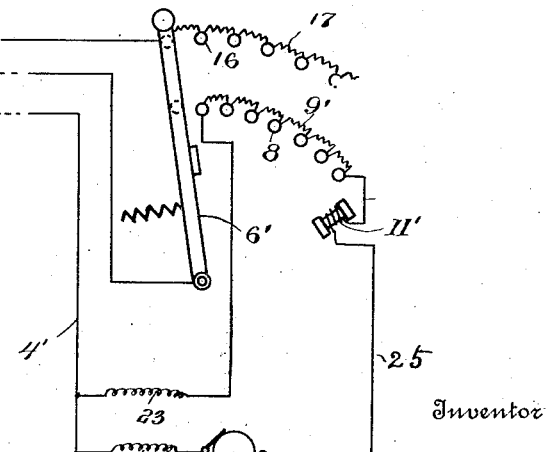

In the accompanying drawing, which illustrates an embodiment of the invention, Figure 1 is a diagrammatic view of the starting apparatus as applied to a shunt motor or other direct current consumption device or system. Fig. 2 is a diagrammatic view of a portion of the starter in connection with a compound wound motor.

Similar reference characters are employed to designate corresponding parts throughout the views.

Referring to the drawing, A designates a mercury arc rectifier having direct current terminals 1 and 2 from which lead positive and negative wires 3 and 4, respectively, that contain a switch 5. The starting anode 5ᵃ is connected by means of conductor 5ᵇ with any preferred form of starting device (not shown). The negative wire 4 leads to a suitable consumption means designated generally by B, which may be a motor, railway or other system having translating devices, and the wire 3 leads to a starting device S by which current for the consumption device B can be gradually raised from zero to maximum. The device S comprises a lever 6 pivoted at 7 and to which the wire 3 is connected, and this lever is adapted to move over and engage a series of contacts 8 having resistance elements 9, as is common in motor starters. The contact at one end of the series is connected by a wire 10 with the consumption device or circuit B, there being in the wire 10 a no-load release magnet 11 which attracts an armature 12 on the lever when the latter is in running position, the pull of the magnet being in opposition to a retractile spring 13, which tends to move the lever 6 to off position. When the load in the consumption circuit is thrown off, the magnet 11 will release the lever 6 and allow the same to return to the position shown in Fig. 1.

As it is necessary to operate the rectifier at or near normal direct current load, it is desirable to provide means for taking whatever excess of current may exceed that required by the motor or consumption circuit, as in starting, or when said circuit is opened automatically upon no-load condition. For this purpose, a storage battery D is employed as an overflow reservoir for the excess current. The terminal 14 is connected by a wire 15 with the first one of a series of contacts 16 that are connected with resistance elements 17, said contacts being so arranged as to be engaged by the lever 6 which forms a conductor. All of these resistances 17 are cut out of the battery circuit when no current is passing through the motor circuit, so that the output of the rectifier A will pass through the battery D and charge the same, the terminal 18 of the battery being connected by a wire 19 with the negative wire 4, it being understood that any desirable means for starting the arc of the rectifier is used. To permit the battery to supply current to the motor or other translating device B when the rectifier is not operating, a switch 20 normally included in the wire 15 can connect the latter wire with the positive wire 3 by the wire 21 and contact 22, and of course the switch 5 will be opened when the battery D supplies the operating current. In starting the motor, the lever is moved from the position shown in Fig. 1 to the right, and as the result the resistances 9 are gradually cut out of the motor circuit and the resistances 17 cut into the battery circuit, thereby causing current of gradually increasing strength to pass through the motor and current of gradually decreasing strength to flow to the battery, until finally the battery is entirely cut out of circuit and at which time the motor receives the full output of the rectifier.

Referring to Fig. 2, the motor M has shunt and series windings 23 and 24 that both connect with the wire 4' leading to the negative side of the rectifier, and the armature of the motor is connected by a wire 25 with the resistances 9' through the winding 11', the operation being substantially the same as the arrangement shown in Fig. 1, except that as the lever 6' is operated to running position, the resistances 9' are introduced into the shunt winding of the motor field.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. The combination of a mercury arc rectifier, consumption means in circuit with the direct current side thereof, and means for utilizing the current in excess of that required for the said consumption means in starting and when the circuit of said consumption means is open to maintain the direct current output of the rectifier approximately normal.

2. The combination of a rectifier, consumption means in circuit with the direct current side thereof, means for utilizing the current in excess of that required for the said consumption means in starting and when the circuit of said consumption means is open to maintain the direct current output of the rectifier approximately normal, and means for supplying current to the consumption means from the last-mentioned means when the rectifier is idle.

3. The combination of a rectifier, a consumption circuit connected to the direct current side of the rectifier, a storage battery connected with the direct current side, resistance means in circuit with the battery and in the consumption circuit, and means for cutting out the resistance of the consumption circuit in starting and cutting in the resistance of the battery circuit.

4. The combination of a rectifier, a consumption circuit connected to the direct current side of the rectifier, a storage battery connected with the direct current side, resistance means in circuit with the battery and in the consumption circuit, means for cutting out the resistance of the consumption circuit in starting and cutting in the resistance of the battery circuit, and means for utilizing current from the battery for supplying the consumption circuit when the rectifier is idle.

5. The combination of a rectifier, a consumption circuit connected to the direct current side of the rectifier, a storage battery connected with the direct current side, resistance means in circuit with the battery and in the consumption circuit, means for cutting out the resistance of the consumption circuit in starting and cutting in the resistance of the battery circuit, and a no-load responsive device in the consumption circuit for permitting the said circuit to automatically open and for permitting the resistance of the battery circuit to be cut out.

In testimony whereof I affix my signature in presence of two witnesses.

MAX KUSHLAN.

Witnesses:
 E. EDMONSTON, Jr.,
 C. BRADWAY.